UNITED STATES PATENT OFFICE.

HANS KUZEL, OF BADEN, NEAR VIENNA, AUSTRIA-HUNGARY.

PROCESS OF CONVERTING ELEMENTS INTO THE COLLOIDAL STATE.

No. 871,599.  Specification of Letters Patent.  Patented Nov. 19, 1907.

Application filed November 20, 1906. Serial No. 344,333.

*To all whom it may concern:*

Be it known that I, HANS KUZEL, a subject of the Emperor of Germany, residing at Baden, near Vienna, in the Empire of Austria-Hungary, have invented certain new and useful Improvements in the Process for Converting Elements into the Colloidal State, of which the following is a full, clear, and exact description, such as will enable others skilled in the art to make and use the same.

This invention relates to an improved process for converting elements into the colloidal state.

In order to facilitate the understanding of the following description I shall first make a few explanatory remarks on the terminology and technical terms hereinafter used, though their meaning is well known in the art.

Since Thomas Graham's investigations (*Philosophical Transactions* of 1861, page 183 and the following) two physical states of matter have been recognized, the crystalloidal state and the colloidal state. The latter state is in the first place characterized by the fact that matter while in that state is capable of forming a kind of solution with various liquids but is not capable of crystallizing out of such solutions and is not capable or only to a very small extent capable of permeating through animal membranes (dialysis). Besides these colloidal solutions show the so-called "Tyndall effect", that is to say, a cone of light thrown into them by means of a positive lens is more or less clearly visible, the light emitted from such cone being polarized.

According to Graham, matter while in this state of colloidal solution is called a "sol" in general, and more particularly "hydrosol", "alcosol", "xylosol", or "organosol", according as the liquid in which it is dissolved is water, alcohol, xylol, or broadly, a liquid organic compound, while the liquid is called "imbibition liquid", and the solution itself is called "colloidal solution", a "pseudo solution", or a "colloidal suspension", to distinguish it from the ordinary solutions formed by crystalloids, from which the matter dissolved is capable of crystallizing and permeating readily through a membrane (dialysis) and which does not show the Tyndall effect, as for instance, the solution of common salt.

In some cases, by cautiously evaporating a colloidal or pseudo solution the matter dissolved may be obtained in a dry state (in many cases in the form of an amorphous varnish or rosin like deposit) but retaining its capability of forming pseudo solutions with the said liquid, or so to speak, remaining soluble in the imbibition liquid. This dry substance is then likewise called a "sol" (a dry hydrosol, alcosol, etc. as the case may be).

On adding to the colloidal solutions certain compounds capable of readily forming ordinary solutions with the imbibition liquid, for instance, salts, acids, etc., such compounds being generally called "electrolytes" (Conf. Whetham l. c. 395 "*On Coagulative Power of Electrolytes*") the sols are precipitated in the form of gelatinous masses. Matter while it is in this gelatinous state is called a "gel" (and more particularly a hydrogel, alcogel, etc., according to the imbibition liquid). The quantity of the electrolytes necessary to bring about the precipitation of the gels is in most cases very small and in numerous cases even a trace of an electrolyte is sufficient to bring about the precipitation.

From the gelatinous gels in many cases the imbibition liquid retained by them may be removed by cautious evaporation at low temperature, low pressure, etc. and thus the gel may be reduced to an apparently dry amorphous solid. On intimately mixing this solid gel or the dry sol with imbibition liquid the latter in most cases is taken up by the former (re-imbuement, swelling up) and a pasty gel is formed again.

While the production of organic colloids as also the formation of colloidal metal compounds such as for instance, oxids, hydroxids, sulfids etc. has been in many cases observed in various chemical processes and has been carefully studied, particularly since Graham's classical investigations, our knowledge about the colloidal state of the free elements was for a comparatively long time limited to a few representatives of the group of precious metals.

It has been only in recent years that this narrow circle has been considerably widened, more particularly by the studies of Bredig, Billitzer, Lottermoser and others, the attempt to obtain a whole series of metals in the form of their sols and gels partly by a chemical way, partly by the method of electrical atomizing having been found successful. But a number of industrially important metals and metalloids distinguished more particularly by their high melting temperatures could not until now be investigated because the methods known up to now were not sufficient for their conversion into the colloidal state. These are the following elements: chromium, manganese, molybdenum, uranium, tungsten, vanadium, tantalum, niobium, titanium, boron, silicon, thorium, zirconium, platinum, osmium and iridium.

An exact process for producing the above-named elements in the colloidal state has not been described up to now.

Such a process is the object of the present invention and is based on the discovery that the above named elements, no matter whether they are used in the crystalline or in the amorphous state, are readily converted into sols and gels if they are treated in a most finely powdered state with dilute solutions of various chemical reagents in alternating succession for a more or less long period under moderate heating and energetic agitation. A condition for a complete success is that the elements to be converted into the colloidal state are used beforehand in the state of the most fine comminution obtainable by mechanical operations, such as grinding, sifting, bolting, wet grinding, levigating etc. and more particularly in the case that the material to be treated is crystalline. Also the coarser particles of the metals obtained by cathodic atomizing according to the methods of Bredig, Bredig and Haber, or Billitzer and not colloidally dissolved are very suitable as the raw material for the present process.

The succession of the reacting dilute solutions is preferably so selected that a solution of an acid character is always followed by a solution of basic or neutral character, a washing with distilled water or such organic liquids in which the solutions used are soluble for instance alcohols etc. being preferably interposed between the several treatments. As such solutions to be used and of an acid character I may use from 0.5 per cent to 20% solutions of organic acids, such as formic acid, acetic acid, chloroacetic acid, tartaric acid, citric acid, salicylic acid etc., then of phenols, such as benzol phenols, resorcin, phloroglucin etc., further inorganic acid, such as hydrocyanic acid, hydrochlorid acid, sulfuric acid, phosphoric acid, and the like, then salts having an acid reaction, such as ammonium chlorid, calcium chlorid, magnesium chlorid, aluminium chlorid and so on, ferric nitrate etc., sulfates, bisulfites, sulfites, pyrosulfites etc.

As solutions of a basic character I may use 0.5 per cent to 10% solutions of caustic alkalies, caustic earth alkalies, alkali carbonates, bicarbonates, then alkali cyanids, ammonium cyanid, alkali ferro cyanids etc., then solutions of ammonia and the energetic organic bases, such as methylamins, pyridin and similar bases. Also, though less advantageously, in lieu of the alkaline solutions neutral salt solutions may be used. As solvents in all kinds of the above solutions also such organic solvents may be used that can substitute the imbibition water in the sols, for instance methylic alcohol, ethylic alcohol, glycerin and so on.

An example of carrying into practice may serve to illustrate the process: For instance 10 kilograms tungsten as obtained by known methods by cautiously reducing pure tungsten trioxid in a current of hydrogen or by means of light metals are brought to the state of finest powder by means of the best mechanical appliances and are heated to a temperature of less than 100° centigrade for at least 5 hours but preferably for from 24 to 48 hours in a water bath with 75 kilograms of 15% hydrochloric acid under thorough agitation and repeated renewal of the hydrochloric acid, and then separated from the acid by decantation and washed in the same way with distilled water until the hydrosol already formed begins to go into colloidal solution. The washing is interrupted and 75 kilograms of a 1% solution of potassium cyanid are added to the substance and heating in the water bath under thorough agitation for about 5 to 24 hours again takes place, whereupon after washing with distilled water thorough agitation with a solution of acid character for instance 75 kilograms of a 1% solution of ferrous sulfate for about 24 hours takes place in a water bath. After this treatment and after complete removal of the iron by washing with distilled water, as a solution of basic character for instance a 2% alcoholic solution of monomethylamin or a 0.5% solution of caustic soda may be used and so on.

If the raw material was sufficiently finely powdered it will be found as a rule that after the second to fourth double treatment, that is to say, after using twice to four times the acid solutions, the tungsten in most cases goes into solution with distilled water as colloidal tungsten leaving a trifling residue. From this solution which is preferably caused to run through filtering paper, the tungsten can be readily and completely precipitated by the addition of small quantities of electrolytes for instance sodium chlorid and may be obtained by causing it to deposit by decantation, careful suction in a sucking apparatus etc. in the form of a grayish black mass which can be dried in vacuum or in a current of hydrogen and then burns in the air forming tungsten trioxid and in such case shows exactly the increase in weight calculated for pure tungsten.

If the action taking place in the present process is examined, it is seen to be chemically analogous to the method of cathodic atomizing discovered by Bredig for producing colloidal metals by means of the electric current (Bredig, *Zeitschrift für angwandte*

*Chemie* 1898, page 951; Bredig and Haber, *Berliner Berichte*, Berlin 1898, page 2741; Bredig's *Anorganische Fermente*, Leipsic 1910.)

The same effect that is produced there by the use of electric energy is brought about in the present process by the material which is already given in the highest state of mechanical comminution being further disintegrated by a subsequent chemical comminution.

The reason of the chemical comminution taking place is obviously to be sought in the actions of alternating formation and decomposition of absorption compounds which actions are in turn systematically brought about by the frequent changes of the acting solutions and the washing with distilled water alternating therewith. This is equivalent to a continuous slight etching or dissolving of the particles of the material which particles have been already mechanically reduced to the smallest possible dimensions and causes a progressive loosening of the connection of the groups of molecules whereby the latter undergo a continuous surface development (Müller, *Theorie der Colloide*, Leipsic and Vienna 1903, page 28) until they are at last only so loosely connected that they acquire the property of homogeneously swelling (Lottermoser, *Anorganische Colloide*, Stuttgart, page 74, line 6 from bottom, Müler, *Theorie der Colloide*, Leipsic and Vienna 1903, page 40, 3rd paragraph from top) and constitute peculiar liquid combinations of groups of molecules (Müller, *Theorie der Colloide*, Leipsic and Vienna 1903, page 48, 4th par. from top) which state of substance is called the colloidal state of the same in science.

In any case the success of the present process has only to be attributed to the enormous increase of surface systematically brought about by the conditions imposed, whereby then phenomena are provoked, the theoretical basis of which is entirely unknown up to now, but of which it is certain, that the formation as well as the existence of the colloids themselves as also the peculiarities and the behavior of the latter are consequent upon it, (Müller *Theorie der Colloide* Leipsic and Vienna 1903, page 47, line 11 from bottom and the following).

Claim

1. The herein described process of converting metals and metalloids into the colloidal state, consisting in first comminuting the elements and then treating the same alternately with dilute solutions of an acid character and then with dilute solutions of a non-acid character.

2. The herein described process of converting metals and metalloids into the colloidal state, consisting in first comminuting the elements and then treating the same under heat and agitation alternately with dilute solutions of an acid character, and then dilute solutions of a non-acid character.

3. The herein described process of converting metals and metalloids into the colloidal state, consisting in first comminuting the elements and then treating the same under heat and agitation alternately with dilute solutions of an acid character, and then dilute solutions of a non-acid character, and between such treatments washing with pure imbibition liquid.

In testimony whereof I have signed my name to this specification, in the presence of two subscribing witnesses.

HANS KUZEL.

Witnesses:
JOHN GEORGE KAEDY,
ALVESTO S. HOGUE.